United States Patent
Midholt et al.

(10) Patent No.: US 9,323,407 B2
(45) Date of Patent: Apr. 26, 2016

(54) ELECTRONIC DEVICE AND METHOD OF PROCESSING USER ACTUATION OF A TOUCH-SENSITIVE INPUT SURFACE

(71) Applicant: Sony Mobile Communications AB, Lund (SE)

(72) Inventors: Magnus Midholt, Lund (SE); Ola Thorn, Limhamn (SE); David De Leon, Lund (SE); Linus Martensson, Lund (SE); Jim Rasmusson, Vellinge (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 80 days.

(21) Appl. No.: 14/099,011

(22) Filed: Dec. 6, 2013

(65) Prior Publication Data

US 2014/0184558 A1 Jul. 3, 2014

(30) Foreign Application Priority Data

Dec. 28, 2012 (EP) .................................... 12008644

(51) Int. Cl.
*G06F 3/041* (2006.01)
*G06F 3/044* (2006.01)
*G06F 3/0488* (2013.01)

(52) U.S. Cl.
CPC ................ *G06F 3/044* (2013.01); *G06F 3/041* (2013.01); *G06F 3/0414* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 5,621,438 A | * | 4/1997 | Kamimura | G06F 1/1613 345/156 |
| 6,323,846 B1 | * | 11/2001 | Westerman | G06F 3/0235 345/173 |
| 6,727,892 B1 | * | 4/2004 | Murphy | G06F 3/04842 178/18.01 |
| 7,605,804 B2 | * | 10/2009 | Wilson | G06F 3/0488 345/173 |
| 8,638,320 B2 | * | 1/2014 | Harley et al. | 345/179 |
| 2002/0130850 A1 | * | 9/2002 | Kobayashi et al. | 345/180 |
| 2006/0244735 A1 | * | 11/2006 | Wilson | G06F 3/0488 345/173 |
| 2008/0042994 A1 | * | 2/2008 | Gillespie | G06F 3/03547 345/174 |
| 2008/0106520 A1 | * | 5/2008 | Free | G06F 3/03545 345/173 |
| 2009/0167702 A1 | * | 7/2009 | Nurmi | G06F 3/0346 345/173 |
| 2010/0134428 A1 | * | 6/2010 | Oh | G06F 3/0234 345/173 |
| 2010/0220066 A1 | * | 9/2010 | Murphy | 345/173 |
| 2010/0289754 A1 | * | 11/2010 | Sleemang | G06F 3/0416 345/173 |
| 2011/0210943 A1 | | 9/2011 | Zaliva | |

(Continued)

OTHER PUBLICATIONS

Walker, Geoff, "Touch and the Apple iPhone", Jun. 13, 2011, [retrieved from the Internet], <http://web.archive.org/web/20110613140443/http://www.veritasetvisus.com/VVTP-12,%20Walker.pdf>, pp. 50-54.

(Continued)

*Primary Examiner* — Dismery Mercedes
(74) *Attorney, Agent, or Firm* — Renner, Otto, Boisselle & Sklar, LLP.

(57) ABSTRACT

An electronic device includes a proximity-sensitive touch sensor array which extends along an input surface of the electronic device and a processing device coupled to the touch sensor array. The processing device is configured to process data captured by the touch sensor array to determine a finger angle at which a finger is directed towards the input surface and an actuation position on the input surface. The processing device is configured to establish an offset-corrected actuation position as a function of the actuation position and the finger angle.

16 Claims, 9 Drawing Sheets

(56) References Cited

U.S. PATENT DOCUMENTS

| | | | |
|---|---|---|---|
| 2011/0227872 A1* | 9/2011 | Huska | G06F 3/016 345/174 |
| 2011/0260998 A1* | 10/2011 | Ludwig | G06F 3/0414 345/173 |
| 2012/0068923 A1* | 3/2012 | Tashiro | G06F 3/038 345/157 |
| 2012/0299848 A1* | 11/2012 | Homma | G06F 3/0488 345/173 |
| 2013/0009907 A1* | 1/2013 | Rosenberg | G06F 3/046 345/174 |
| 2013/0106740 A1* | 5/2013 | Yilmaz | G06F 3/038 345/173 |
| 2013/0201155 A1* | 8/2013 | Wu | G06F 3/03547 345/174 |
| 2014/0028577 A1* | 1/2014 | Krah | G06F 3/0416 345/173 |

OTHER PUBLICATIONS

Search Report from corresponding European Application No. 12008644.2, mailed on May 6, 2013.

* cited by examiner

ELECTRONIC DEVICE AND METHOD OF PROCESSING USER ACTUATION OF A TOUCH-SENSITIVE INPUT SURFACE

FIELD OF THE INVENTION

The application relates to an electronic device and to a method of processing user actuation of an input surface. The application relates in particular to electronic devices which have a proximity-sensitive touch sensor array to detect an actuation location.

BACKGROUND OF THE INVENTION

Touch screens are used in a wide variety of electronic devices. Handheld electronic devices, such as handheld mobile communication terminals, are frequently provided with a proximity-sensitive touch sensor array. The electronic device performs a function in response to an input action, which depends on the actuation position at which the user touches an input surface of the electronic device, e.g. a window overlaid onto a display.

One general problem with this kind of user input interface is that there may be a discrepancy or offset between where a user thinks he has pressed onto the input surface and the actuation position at which the user has actually pressed onto the input surface. With increasing processing capabilities and functionalities provided in electronic devices such as mobile communication terminals, the offset problem may cause the electronic device to perform an operation which is different from the operation intended by the user.

SUMMARY

There is a continued need in the art for an electronic device and for a method of processing user actuation of an input surface which address some of the above shortcomings. In particular, there is a continued need in the art for an electronic device and for a method of processing user actuation of an input surface in which the user input is processed so as to mitigate the risk that an operation other than the one intended by the user is performed.

According to embodiments, a finger angle at which the finger is directed towards an input surface of the electronic device is determined. An offset-correction is performed which depends on the finger angle. For illustration, an offset having a magnitude which is set based on the finger angle may be added to a detected actuation position on the input surface. Since the discrepancy between where a user thinks he has pressed onto the input surface and the actuation position at which the user has actually pressed onto or otherwise actuated the input surface depends on how the finger is directed towards the input surface, this technique allows the electronic device to at least partially correct for this offset.

According to embodiments, both the actuation location and the finger angle are determined from data captured using a proximity-sensitive touch sensor array. This allows an improved input accuracy to be attained using commodity hardware, such as a capacitive touch sensor array, which is at any rate provided to detect the actuation position.

According to an embodiment, an electronic device is provided. The electronic device comprises a proximity-sensitive touch sensor array which extends along an input surface of the electronic device. The electronic device comprises a processing device coupled to the touch sensor array and configured to process data captured by the touch sensor array. The processing device is configured to process the data captured by the touch sensor array to determine a finger angle at which a finger is directed towards the input surface and an actuation position on the input surface. The processing device is configured to establish an offset-corrected actuation position as a function of the actuation position and the finger angle.

The processing device may be configured to determine a variation in distance of the finger from the input surface in a spatially resolved manner and to derive the finger angle from the variation in distance. The variation in distance can be determined from the data captured using the touch sensor array.

The touch sensor array may comprise a conductive pattern for capacitive touch and proximity sensing. The conductive pattern may be formed from a translucent material, e.g. from Indium Tin Oxide (ITO), graphene, or other suitable materials. The conductive pattern may be attached to a window or a separate panel member. The conductive pattern may be overlaid onto a display. The processing device may process data which represent self-capacitances or mutual capacitances of the conductive pattern to determine the finger angle.

The conductive pattern may comprise a plurality of rows and a plurality of columns. The processing device may be configured to determine the finger angle based on self-capacitance measurements of the plurality of rows and self-capacitance measurements of the plurality of columns. The processing device may be configured to determine the finger angle based on both mutual capacitance measurements and self-capacitance measurements.

Alternatively or additionally to capacitive sensing, the touch sensor array may be configured to use sensing techniques other than capacitive touch and proximity sensing. For illustration, the touch sensor array may comprise an optic touch sensor. The touch sensor array may comprise an Infrared (IR) sensing sensor array. The touch sensor array may use electrical fields for proximity and touch sensing. The touch sensor array may use sonar, ultra sound and/or Doppler measurements for proximity and touch sensing.

The processing device may be configured to determine the actuation position based on mutual capacitance measurements between rows and columns of the conductive pattern.

The processing device may be configured to determine the actuation position based on the self-capacitance measurements of the plurality of rows and of the plurality of columns.

The processing device may be configured to carry out a row scan to perform the self-capacitance measurements for the plurality of rows and a column scan to perform the self-capacitance measurements for the plurality of columns, and to derive the finger angle from data obtained in the row scan and data obtained in the column scan.

The processing device may be configured to derive the finger angle from a spatial gradient of self-capacitance data and/or mutual capacitance data. The processing device may be configured to compare the data captured in the row scan to a first plurality of spatially-dependent data sets and to compare the data captured in the column scan to a second plurality of spatially-dependent data sets, and to determine the finger angle from both comparisons. Each one of the data sets may be associated with respectively one of plural pre-defined finger angles. An interpolation between the different pre-defined finger angles may be performed. Both the finger angle and a direction of a projection of the finger onto the input surface may be derived from the data captured using the touch sensor array. The finger angle may be computed as weighted average of the pre-defined finger angles, with the weighting factors depending on self-capacitance data and/or mutual capacitance data.

The processing device may be a controller coupled to the conductive pattern. The controller may be configured to provide the offset-corrected actuation position to an application processor of the electronic device. The controller may be an application-specific integrated circuit. By integrating the finger angle dependent offset-correction into the controller of the touch sensor panel, no modifications have to be made to the application processor(s) of the electronic device.

The processing device may be configured to add or subtract an offset to the actuation position on the input surface to establish the offset-corrected actuation position.

The processing device may be configured to establish a magnitude of the offset as a function of the finger angle. The magnitude of the offset may be independent on the actuation position at which the finger was pressed against the input surface. The magnitude of the offset may be a decreasing function of finger angle.

The processing device may be configured to derive a finger orientation from the data captured by the touch sensor array, the finger orientation defining a direction of a projection of the finger onto the input surface. I.e., the finger orientation defines how the finger is oriented relative to the in-plane coordinate axes of the input surface. The finger angle defines how the finger is oriented relative to the plane of the input surface. The processing device may be configured to establish a direction of the offset as a function of the finger orientation. The processing device may be configured to establish the direction of the offset as a function of the finger orientation and independently from the finger angle. The processing device may be configured to establish the magnitude of the offset as a function of the finger angle and independently from the finger orientation.

The touch sensor array may further comprise a force sensor configured to determine a force with which the finger is pressed or multiple fingers are pressed against the input surface. The processing device may be configured to derive an offset-corrected force value from an output of the force sensor and the finger angle. In this way, offset problems may be compensated at least in part also for the force which is applied by the user. Performing offset-correction for force sensor values may be useful in particular when the force is used as an input coordinate, sometimes also referred to as z-coordinate, in addition to or alternatively to the x and y coordinates on the input surface.

The processing device may be configured to determine finger angles for plural fingers which perform a multi-touch operation on the input surface. An offset-corrected actuation position may be determined for each one of the plural fingers. Thereby, offset correction may be performed also for multi-touch operations.

The electronic device may further comprise an application processor coupled to the processing device to receive the offset-corrected actuation position. The application processor may be configured to perform an operation which is selected in dependence on the offset-corrected actuation position.

The electronic device may be a handheld wireless communication terminal. The electronic device may be a handheld portable telephone, a personal digital assistant, or a handheld computer.

Look-up tables and/or functions which are used to determine an offset in dependence on the determined finger angle may be stored in the electronic device. The look-up tables and/or functions may be pre-defined data, which may be generated by sampling offsets for various users as a function of finger angle and processing the sampled data to generate tables and/or functions that can be queried to determine an offset as a function of finger angle. Alternatively or additionally, the look-up table(s) and/or function(s) may be generated by the electronic device in a training phase in which the electronic device automatically determines the offsets between intended and actual actuation positions for various finger angles. The electronic device may share the look-up tables and/or functions with other devices used by the same user. For illustration, the electronic device may have a communication interface to transfer the look-up tables and/or functions to other electronic terminals and/or to a server.

The processing device may perform an offset-correction which depends on the finger which touches the input surface and/or which depends on an orientation of the electronic device. For illustration, one of several different tables may be queried to determine the offset for a given finger angle, depending on which finger touches the input surface and/or depending on device orientation. Alternatively or additionally, one of several different functions may be evaluated to determine the offset for a given finger angle, depending on which finger touches the input surface and/or depending on device orientation.

According to an embodiment, a method of processing user actuation of an input surface of an electronic device is provided. Data are captured using a proximity-sensitive touch sensor array which extends along the input surface of the electronic device. The data captured by the touch sensor array are processed to determine a finger angle at which a finger is directed towards the input surface and an actuation position on the input surface. An offset-corrected actuation position is established as a function of the actuation position and the finger angle.

Further features of the method according to embodiments and the effects attained thereby correspond to the features of the electronic devices according to embodiments.

The method may be performed by the electronic device of any one aspect or embodiment.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS

Figure 1:
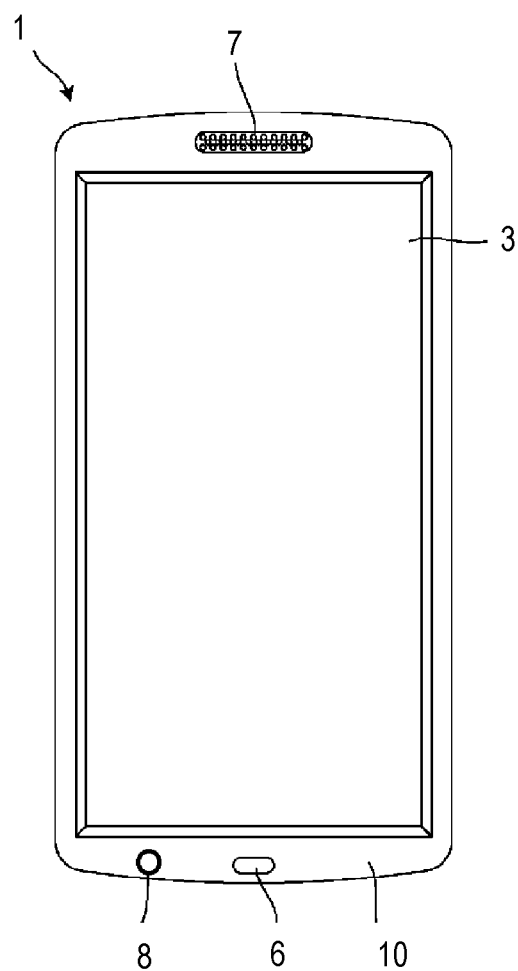
FIG. 1 is a front view of an electronic device according to an embodiment.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative for embodiments. The features of the various embodiments may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof. While electronic devices of an embodiment may be wireless communication devices such as cellular telephones, personal digital assistants, or other handheld devices having communication capabilities, the input interface is not limited to being used in such handheld communication devices.

Electronic devices having an input interface will be described. The input interface comprises a proximity-sensitive touch sensor array. A processing device is coupled to the proximity-sensitive touch sensor array and is configured to determine not only an actuation position, e.g. a touch position, but also a finger angle from data captured by the touch sensor array. The finger angle defines at which angle the finger is directed towards an input surface. The finger angle may be defined as the angle between a longitudinal axis of the finger and the input surface or as the angle between a lower side of the finger and the input surface. The processing device performs an offset correction which depends on the finger angle. An offset may be added to the actuation position to establish an offset-corrected actuation location, with the magnitude of the offset being determined as a function of the finger angle. The magnitude of the offset may decrease with increasing finger angle.

Figure 2:
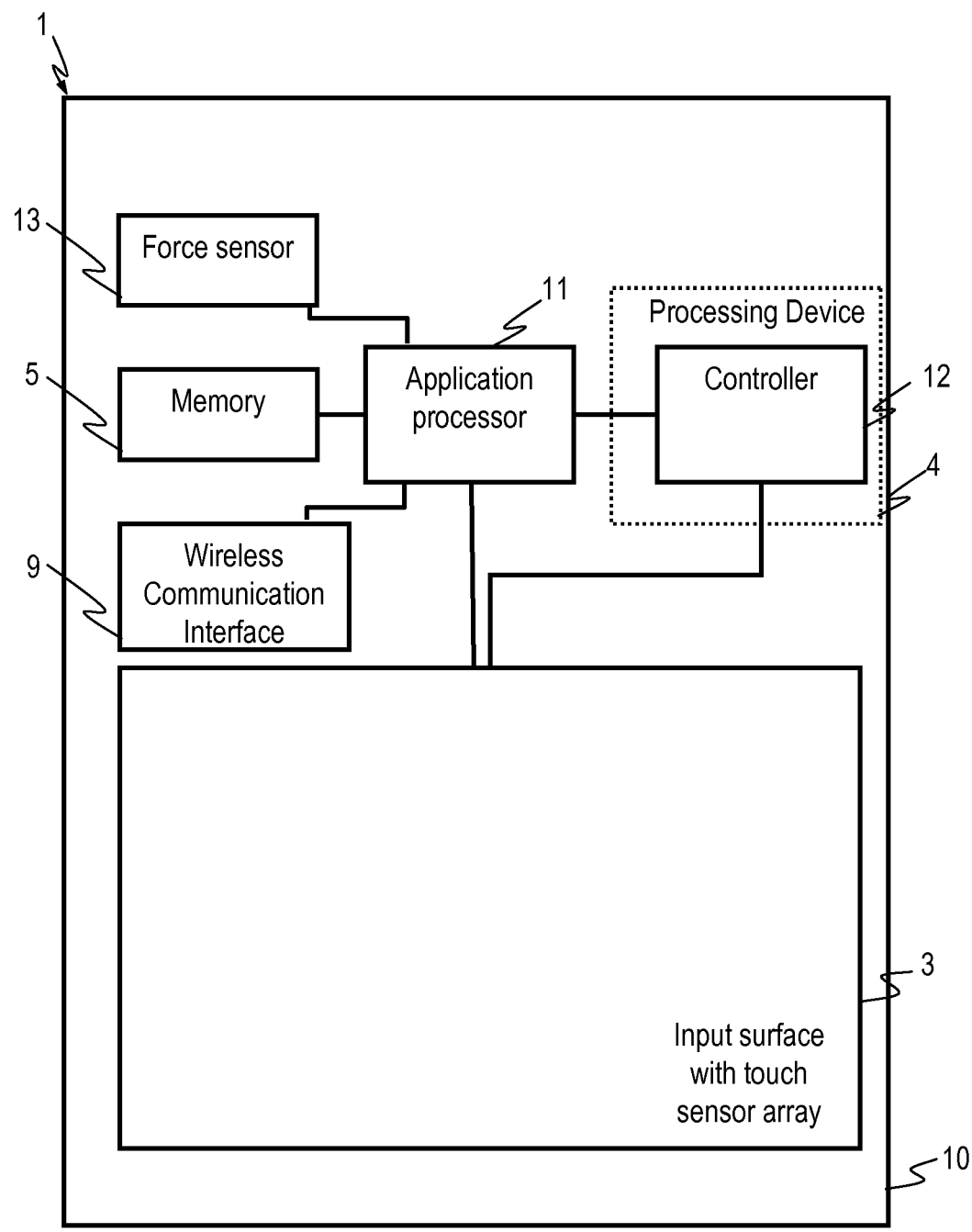
FIG. 2 is a block diagram of the electronic device of FIG. 1.

FIG. 1 is a front view of a handheld electronic device 1 and FIG. 2 is a schematic block diagram representation of the handheld electronic device 1. The handheld electronic device 1 has an input interface. The input interface includes a proximity-sensitive touch sensor array which may extend along an input surface 3. The input surface may be defined by a window which is overlaid onto a display. The input interface may comprise a display, thereby implementing a touch-sensitive screen. The handheld electronic device 1 has a processing device 4 coupled to the input interface. The processing device 4 may comprise an application specific integrated circuit and/or one or plural processors. For illustration, the functions of the processing device 4 described below may be performed by a controller 12 of a touch sensor panel. Alternatively or additionally, the functions of the processing device 4 described below may also be performed by an application processor 11 of the handheld electronic device 1. The processing device 4 may be configured such that, at least in some modes of operation, it determines an offset-corrected actuation location by processing data captured by the proximity-sensitive touch sensor array. The processing device 4 may determine how the distance between the finger and the input surface varies as a function of position. The processing device 4 may determine a finger angle from the data captured by the proximity-sensitive touch sensor array. The processing device 4 may add an offset to the sensed actuation position or may subtract an offset from the sensed actuation position, with the offset being selected as a function of the finger angle. The offset may be determined using a look-up table and/or by evaluating a function which quantifies the offset between the position where a user thinks he has touched the input surface and the actual actuation position, as a function of finger angle. By adding this offset to the sensed actuation position, at least part of the discrepancy between the position where a user thinks he has touched the input surface and the actual actuation position may be compensated. The processing device 4 may provide the offset-corrected actuation position to the application processor 11, for example.

The handheld electronic device 1 may be operative as a handheld communication device, e.g. a cellular telephone, a personal digital assistant, a handheld computer or similar. The handheld electronic device 1 may include components for voice communication, which may include a microphone 6, a speaker 7, and a wireless communication interface 9 for communication with a wireless communication network. In addition to the input interface, the handheld electronic device 1 may have separate hard keys 8, such as function and/or control keys, which may be supported on a housing 10 of the electronic device 1. The application processor 11 may perform an operation which depends on the offset-corrected actuation location, such as by retrieving data from a memory 5, determining an alphanumerical input, or performing one of plural voice or data communication operations which is selected as a function of the offset-corrected actuation location.

The electronic device may also comprise a force sensor 13. The force sensor 13 may be operative to determine a force with which a finger or multiple fingers is/are pressed against the input surface 3. The application processor 11 may be operative to perform different functions depending on the force that is sensed. The force thus acts as an additional input coordinate, sometimes also referred to as "z-coordinate" for actuation operations. An offset correction which depends on finger angle may be performed for this z-coordinate, i.e., the force.

With reference to FIG. 3 to FIG. 16, the configuration and operation of input interfaces of electronic devices of embodiments will be explained in more detail.

Figure 3:
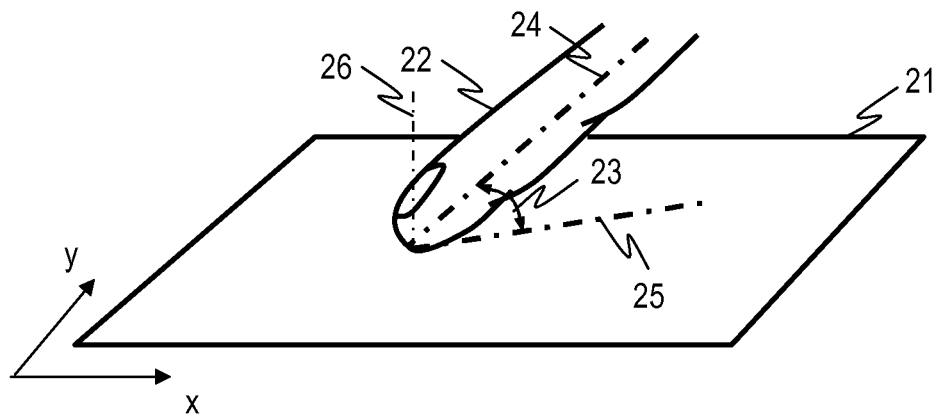
FIG. 3 is a perspective view illustrating offset-correction in electronic devices of embodiments.
Figure 4:
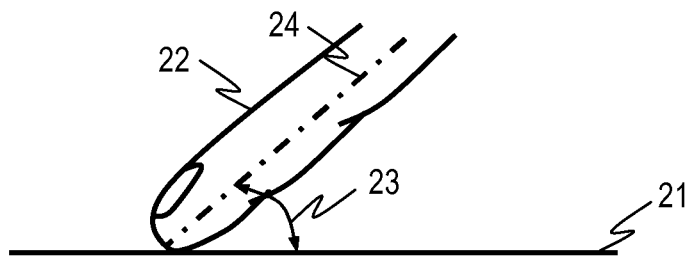
FIG. 4 is a cross-sectional side view of an input surface illustrating determination of a finger angle.

FIG. 3 is a perspective view illustrating a portion of the input surface 21 of the electronic device. FIG. 4 is a cross-sectional view in a plane perpendicular to the input surface 21.

A finger 22 acts as an input member. The procedure of determining an offset-corrected actuation position may be triggered when a contact between the finger 22 and the input surface 21 is detected. When the user pushes the finger 22 against the input surface 21, the finger 22 has a generally straight axis 24. The axis 24 extends at an angle 23 relative to the input surface 21. This angle 23 is the "finger angle" 23 which quantifies how the finger 22 is directed towards the input surface 23. The finger angle 23 may also be determined as 90° minus the angle between the axis 24 and the normal 26 of the input surface. With the lower surface of the finger 22 extending generally parallel to the axis 24, the finger angle 23 may also be determined as the angle between a lower surface of the finger 22 and the input surface 21.

It has been found that the discrepancy between where a user thinks he has pressed onto the input surface 21 and the sensed actuation position varies with finger angle. Electronic devices of embodiments at least partially compensate for this discrepancy by adding an offset to the sensed actuation position. The offset depends on the finger angle. As will be described in more detail below, the finger angle is determined using the proximity-sensitive touch sensor array.

FIG. 3 also illustrates the quantity referred to as "finger orientation" of the finger 22, which defines the direction of the finger 22 relative to the coordinate axes of the input surface 21. The finger orientation is defined by the direction of the line 25 along which a projection of the finger 22 onto the input surface 21 extends. As will be described in more detail below, the processing device may determine both the finger angle 23 and the finger orientation from self-capacitance measurements and/or mutual capacitance measurements of rows and columns of a capacitive touch sensor array. The processing device may determine a magnitude of the offset that is added to the sensed actuation position as a function of the finger angle 23 and independently of the direction of the line 25 along which the projection of the finger 22 onto the input surface 21 extends. The processing device may determine the direction of the offset that is added to the sensed actuation position such that it corresponds to the direction of the line 25 along which the projection of the finger 22 onto the input surface 21 extends. The direction of the offset may be independent of the finger angle 23. The offset 34 may be such that it has a magnitude that depends on the finger angle and that it is directed along the projection line 25 of the finger 22 in a direction away from the finger tip.

Figure 5:
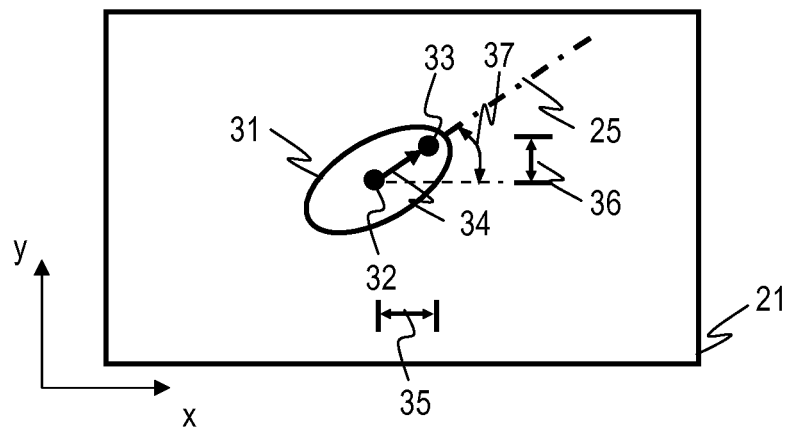
FIG. 5 is a plan view of the input surface illustrating the offset-correction for the finger angle of FIG. 4.

FIG. 5 illustrates how the processing device determines the offset-corrected actuation position. The finger contacts the input surface 21 in a fingerprint area 31. The actuation position 32 may be determined from the fingerprint area 31, e.g. by determining a center of gravity of the area 31 or the position at which the finger causes the most pronounced capacitance change. The offset-corrected actuation position 33 is determined by adding an offset 34 to the actuation position 32. The offset 34 has a magnitude which depends on the finger angle 23. The processing device may derive the magnitude of the offset from the finger angle by querying a look-up-table, by evaluating a function which defines the magnitude of the offset in dependence on the finger angle and/or by interpolating between values defined in a look-up table. The magnitude of the offset is set such that it corresponds to or at least approximates the discrepancy between where the user thinks he has touched the input surface 21 and the sensed actuation position 22, respectively as a function of finger angle.

The direction of the offset 34 depends on the line 25 along which the projection of the finger onto the input surface 21 extends. The processing device may determine an x-shift 35 and a y-shift 36 to compute the offset-corrected actuation position. For illustration rather than limitation, an angle 37 between the line 25 and one of the coordinate axes of the input surface may be determined. The x-shift 35 may be computed by multiplying the magnitude of the offset 34 by the cosine of the angle 37. The y-shift 36 may be computed by multiplying the magnitude of the offset 34 by the sine of the angle 37. A wide variety of other techniques may be used to derive the magnitude and direction of the offset 34 from the data captured using the touch sensor array. For illustration, data captured using a capacitive touch sensor array may be directly compared to a plurality of data sets to derive both the magnitude of the offset 34 and the direction of the offset 34.

The finger angle may also be used for additional processing steps. For illustration, an expected fingerprint may be predicted using the finger angle. The expected fingerprint may be matched to the sensed fingerprint 31. The finger angle may in particular be used to account for finger angle dependent changes in the fingerprint. This may be useful when determining a force magnitude from the fingerprint, for example, because the fingerprint generally depends on the finger angle and the force with which the finger is pressed against the input surface.

Figure 6:
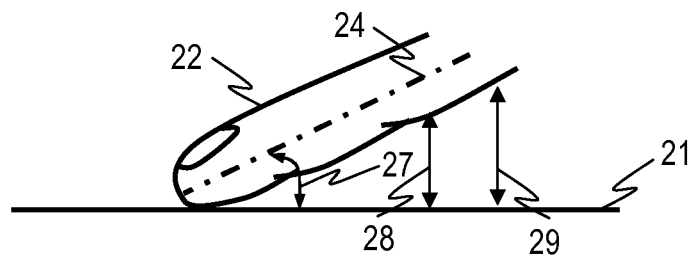
FIG. 6 is a cross-sectional side view of the input surface illustrating determination of another finger angle.
Figure 7:
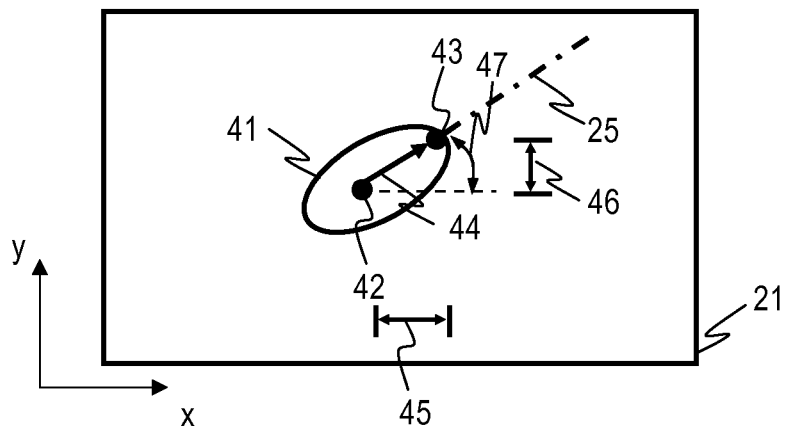
FIG. 7 is a plan view of the input surface illustrating the offset-correction for the finger angle of FIG. 6.

FIG. 6 is a cross-sectional view in a plane perpendicular to the input surface 21 when the finger is directed towards the input surface 21 at another finger angle 27. FIG. 7 is a plan view which illustrates that the offset-corrected actuation position 43 is determined by adding an offset 44 to the sensed actuation position 42. The sensed actuation position 42 may be derived from a fingerprint area 41 in which the finger contacts the input surface 21. The magnitude of the offset 44 is different from the magnitude of the offset 34 illustrated in FIG. 5. This reflects that the discrepancy between where the user thinks he has pressed against the input surface 21 and the actual actuation position varies with finger angle, and that the offset is accordingly selected as a function of finger angle to better compensate this discrepancy. The magnitude of the offset may decrease as the finger angle increases from 0° to 90°.

The processing device of the electronic device of an embodiment determines the finger angle from the data captured using a touch sensor array. As will be explained in more detail with reference to FIG. 8 to FIG. 16, the processing device may derive from the data captured using the touch sensor array how the distance between the finger and the input surface 21, measured perpendicular to the input surface 21, varies as a function of location. This distance variation defines the finger angle. FIG. 6 illustrates distances 28, 29 between the finger and the input surface 21. These distances 28, 29 may be determined from the data captured using a capacitive touch sensor array, for example. The distances 28, 29 between the finger and the input surface 21 may in particular be determined by performing row scans and columns scans for a capacitive touch sensor array in which the self-capacitances of rows and columns of the capacitive touch sensor array are determined. The spatial variation of self capacitances can be used to determine the finger angle.

Figure 8:
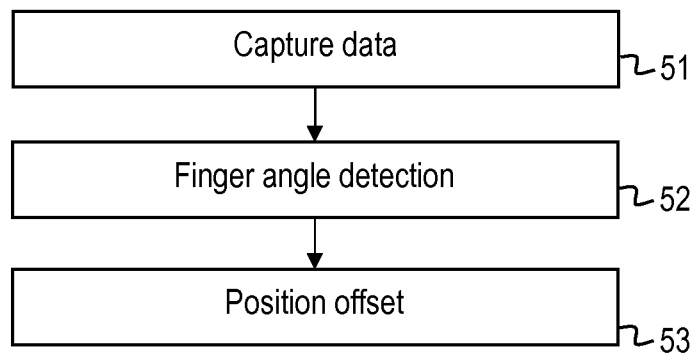
FIG. 8 is a flow chart of a method according to an embodiment.

FIG. 8 is a flow chart of a method of an embodiment. The method may be performed by an electronic device of an embodiment.

At 51, data is captured using a proximity-sensitive touch sensor array. The proximity-sensitive touch sensor array may be a capacitive touch sensor array. The capacitive touch sensor array may comprise a conductive pattern which has a plurality of rows and a plurality of columns. Self-capacitance measurements and/or mutual capacitance measurements may be performed to determine the finger angle. Alternatively or additionally, other sensing techniques may be used to capture the data from which the finger angle and actuation position are determined. For illustration, the proximity-sensitive touch sensor array may be an optic touch sensor, an IR sensing sensor array, an electrical field sensor array, a sonar sensor array, an ultra sound sensor array and/or Doppler sensor array configured for proximity and touch sensing.

At 52, the finger angle is determined. The data captured using the proximity-sensitive touch sensor array indicate a distance variation between finger and input surface as a function of position, i.e. in a spatially resolved manner. This information may be used to establish the finger angle. A spatial gradient of self-capacitances and/or mutual capacitances may be determined to derive the finger angle. Alternatively or additionally, the data captured using the proximity sensitive touch sensor array may be compared to a plurality of pre-defined data sets, which are respectively associated with a pre-defined finger angle. Matching of the captured data to the pre-defined data sets may be performed to determine the finger angle. To determine the finger angle with even higher resolution, an interpolation between the pre-defined finger angles may be performed, depending on how well the captured data matches the various pre-defined data sets.

At 53, the offset may be determined. The position offset may be determined by performing a look-up operation. The respective look-up table may specify pre-defined offset magnitudes as a function of finger angle for plural pre-defined finger angles. Interpolation techniques may be used to determine the offset magnitude for the finger angle determined at 52, using a finite set of pre-defined offset magnitudes stored in a look-up table. Alternatively or additionally, the processing device may evaluate a function which depends on the finger angle, using the finger angle determined at 52.

The data captured at 51 may comprise self-capacitances of rows and columns of a capacitive touch sensor array. Self-capacitance measurements offer the advantage of having a large detection range for proximity sensing. This facilitates a reliable determination of the finger angle.

Figure 9:
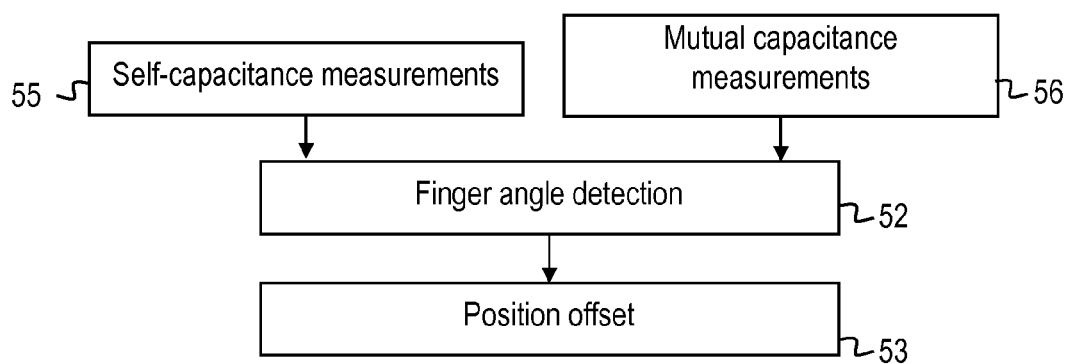
FIG. 9 is a flow chart of a method according to an embodiment.

FIG. 9 is a flow chart of a method of an embodiment. The method may be performed by an electronic device of an embodiment. In the method of FIG. 9, both self capacitance measurements 55 and mutual capacitance measurements 56 are performed. The finger angle is determined at 52 based on both the self-capacitances of rows and columns and on mutual capacitances between rows and columns of the capacitive touch sensor array. The higher spatial resolution of mutual capacitance measurements may be utilized to identify a best match between the captured data and pre-defined finger angles. A weighting may be performed based on the data captured in row and columns scans of the self-capacitance measurements 55 and/or based on the data captured in the mutual capacitance scan at 56, so as to derive the finger angle with high accuracy.

The processing device may perform any one of various processing techniques to determine the finger angle from data captured using the touch sensor array.

In one implementation, the processing device may match the data captured with the touch sensor array to pre-defined data sets which are stored in the electronic device and which correspond to various pre-defined finger angles.

Alternatively or additionally, characteristics of the data captured using the touch sensor array as a function of location may be used to determine the finger angle. For illustration, the gradient in capacitance and/or the length over which the capacitance varies significantly may be used to determine the finger angle.

Figure 10:
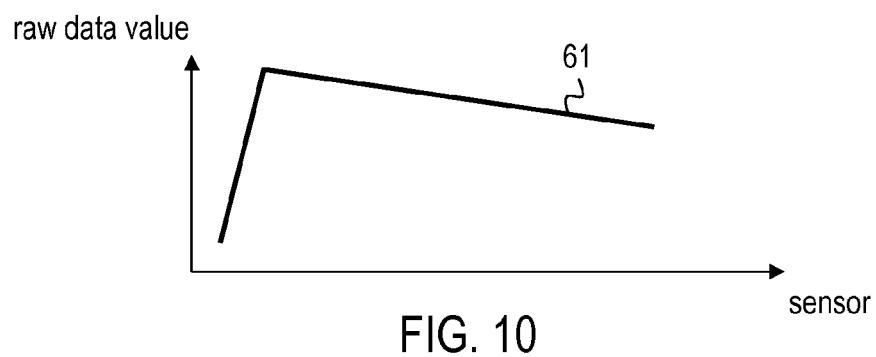
FIG. 10, FIG. 11 and FIG. 12 illustrate determination of a finger angle using a proximity-sensitive touch sensor array.
Figure 11:
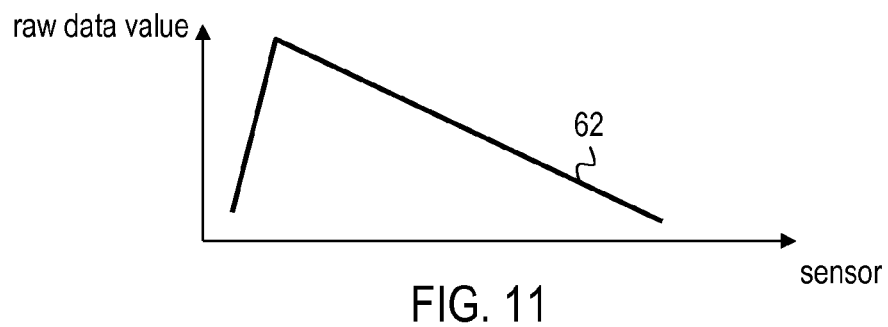
Figure 12:
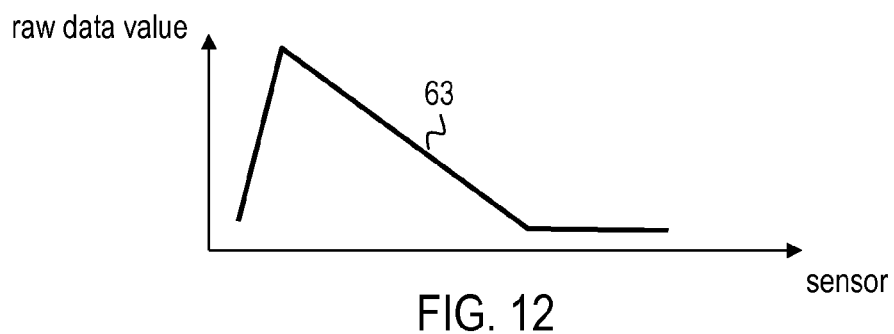

FIG. 10, FIG. 11 and FIG. 12 illustrate exemplary raw data captured using a proximity-sensitive touch sensor array, from which the finger angle and the offset magnitude may be determined. Data as illustrated in FIG. 10, FIG. 11 and FIG. 12 may be obtained when performing a row scan in which self-capacitances of different rows of a capacitive touch sensor array are measured or when performing a column scan in which self-capacitances of different columns of the capacitive touch sensor array are measured. Accordingly, the captured data may represent self capacitances of different rows or different columns, respectively, of a capacitive touch sensor array.

FIG. 10 illustrates the data obtained when the finger is directed towards the input surface at a small finger angle. There is a pronounced increase in self-capacitance in the row or column where the finger tip abuts on the input surface. The sensed self-capacitance decreases with a small gradient 61 in the subsequent rows or columns. This indicates that the finger angle between the finger and the input surface is small, causing the distance between finger and input surface to increase slowly as a function of position. The slope or gradient 61 may be used to determine the finger angle.

FIG. 11 illustrates the data obtained when the finger is directed towards the input surface at a greater finger angle. Again, there is a pronounced increase in self-capacitance in the row or column where the finger tip is located. The sensed self-capacitance decreases with a greater gradient 62 in the subsequent rows or columns. This indicates that the finger angle between the finger and the input surface is greater than in the situation illustrated in FIG. 10, causing the distance between finger and input surface to increase more rapidly as a function of position.

FIG. 12 illustrates the data obtained when the finger is directed towards the input surface at an even greater finger angle. Again, there is a pronounced increase in self-capacitance in the row or column at which the finger tip is located. The sensed self-capacitance decreases with a greater gradient 63 in the subsequent rows or columns. This indicates that the finger angle between the finger and the input surface is greater than in the situations illustrated in FIG. 10 and in FIG. 11, causing the distance between finger and input surface to increase even more rapidly as a function of position.

Based on the data captured using the capacitive touch sensor array, the finger angle may be determined. A look-up operation may be performed and/or a function may be evaluated which depends on the finger angle, to thereby determine the offset which is added to the sensed actuation position. For illustration, for a finger angle of 15°, the offset which is added to the sensed actuation position may have a first magnitude, such as 10 pixels. For a greater finger angle, e.g. a finger angle of 25°, the offset which is added to the sensed actuation position may have a second magnitude which is less than the first magnitude, such as 7 pixels. For even greater finger angle, e.g. a finger angle of 45°, the offset which is added to the sensed actuation position may have a third magnitude which is less than the second magnitude, such as 4 pixels. Generally, the offset which is added to the sensed actuation position to at least partially compensate for finger-angle dependent offset effects may have a magnitude which is a decreasing function of finger angle.

An offset correction which depends on finger angle may be performed not only for the x and y coordinates of the actuation position, but may additionally or alternatively for a z coordinate of an input action. The z coordinate may correspond to a force applied onto the input surface by a finger or by multiple fingers.

Figure 13:
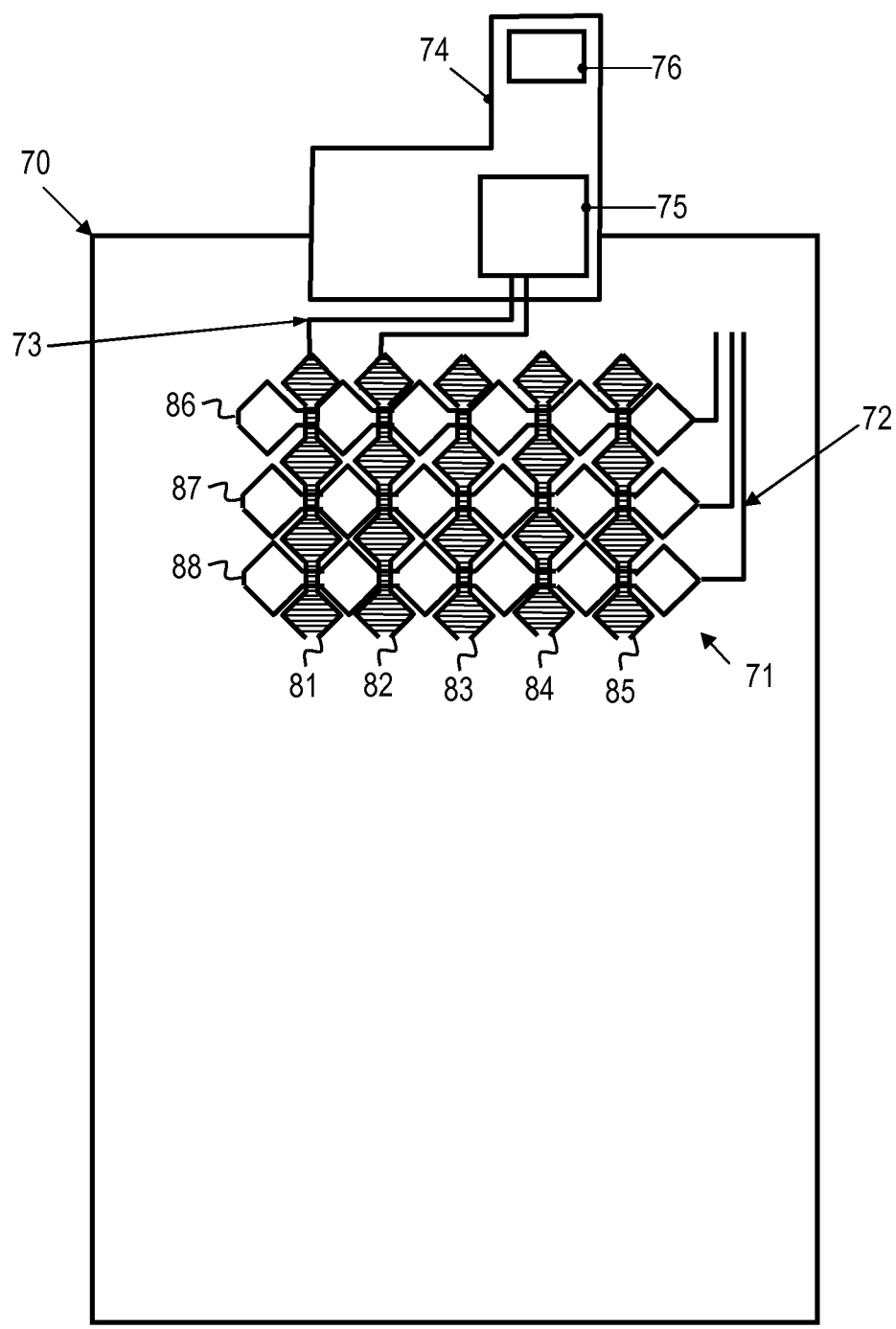
FIG. 13 is a plan view of a touch sensor panel having a proximity-sensitive touch sensor array.

FIG. 13 is a schematic plan view of a touch sensor array 71 which may be used in electronic devices of embodiments. The touch sensor array 71 comprises a conductive pattern which may be applied on a carrier 70. The carrier 70 may be a window overlaid over a display of the electronic device or a separate panel interposed between the display and the window. The conductive pattern has a plurality of columns 81-85 and a plurality of rows 86-88. A flexible printed circuit board (PCB) 74 may be attached to the carrier 70. A controller 75 may be provided on the PCB 74 and may be connected to the conductive pattern by conductive traces 72, 73. The controller 75 may determine the finger angle and actuation position based on capacitance data sensed using the conductive pattern, and may provide the offset-corrected actuation position to the application processor of the electronic device. A connector 76 on the PCB 74 may act as interface between the controller 75 and the application processor.

The controller 75 may perform row scans to determine self-capacitances of the various rows 86-88 of the conductive pattern. The controller 75 may perform columns scans to determine self-capacitances of the various columns 81-85 of the conductive pattern. The controller 75 may determine the finger angle based on the data obtained in the row scans and column scans, as explained with reference to FIG. 10 to FIG. 12.

The controller 75 may also be operative to measure mutual capacitances between rows and columns. For illustrations, the mutual capacitances between various pairs of rows and columns of the conductive pattern may be measured to determine the finger angle. The mutual capacitances may be measured to determine the actuation position.

The determination of the finger angle may be triggered by an input action. For illustration, the processing device may be triggered to determine the finger angle and to establish the offset-corrected actuation position when a contact between finger and input surface is detected. The offset-corrected actuation position may be used by the electronic device to determine which one of plural different operations is to be performed.

Figure 14:
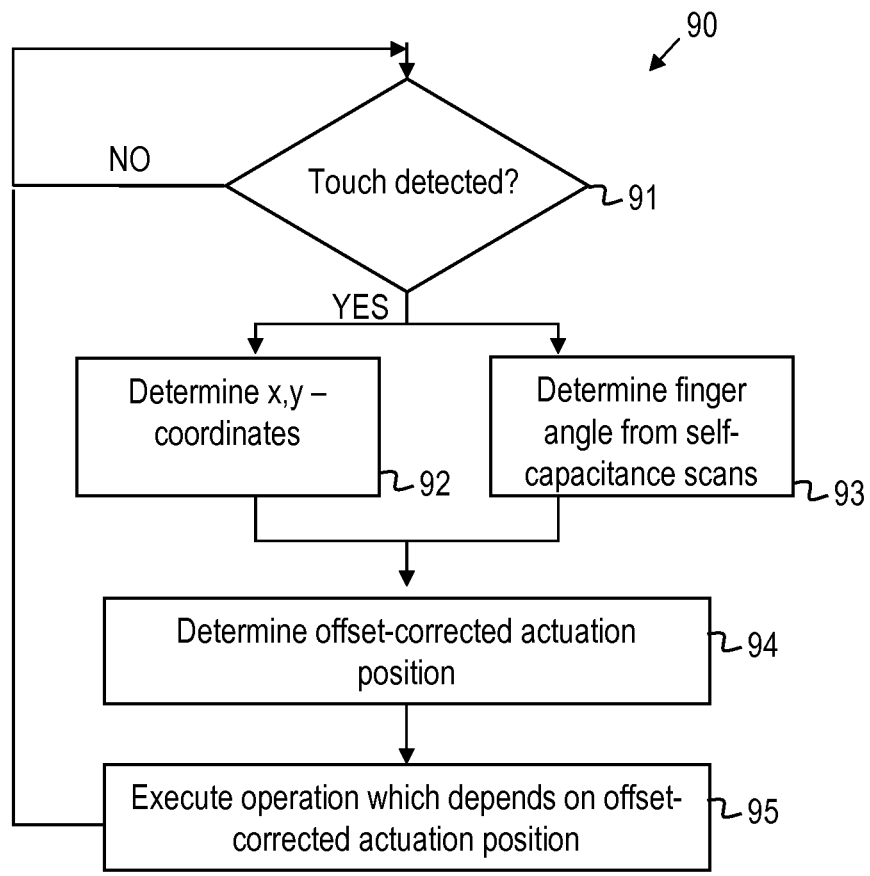
FIG. 14 is a flow chart of a method according to an embodiment.

FIG. 14 is a flow chart of a method 90 of an embodiment. The method may be performed by an electronic device of an embodiment.

At 91, it is determined whether a touch is detected. This determination may be made based on data captured by the touch sensor array. Alternatively or additionally, other sensors may be used to detect a touch. For illustration, the electronic device may have a force sensor which facilitates discrimination of touch and non-touch events.

When a touch is detected, at 92 the coordinates of the actuation position are determined. The actuation position may be determined from data captured in self-capacitance and/or mutual capacitance measurements. The actuation position may also be determined using a finger angle. At 93, the finger angle is determined while the finger contacts the input surface. The finger angle may be derived from data acquired in self-capacitance measurements, e.g. in row scans and column scans.

At 94, the offset-corrected actuation position is determined. An offset may be added to the actuation position. The offset may have a magnitude which depends on the finger angle. The offset may have a magnitude which is a decreasing function as the finger angle increases from a minimum angle to a maximum angle.

At 95, the electronic device performs an operation which depends on the offset-corrected actuation location. For illustration, when a keypad is displayed to allow the user to input alphanumerical data, a key actuated by the user may be selected as a function of the offset-corrected actuation location. For further illustration, when different call-related actions are offered to the user, the action which is executed may be selected as a function of the offset-corrected actuation location.

For a multi-touch input operation, steps 92-94 may be performed for each one of the various fingers which touches the input surface.

Figure 15:
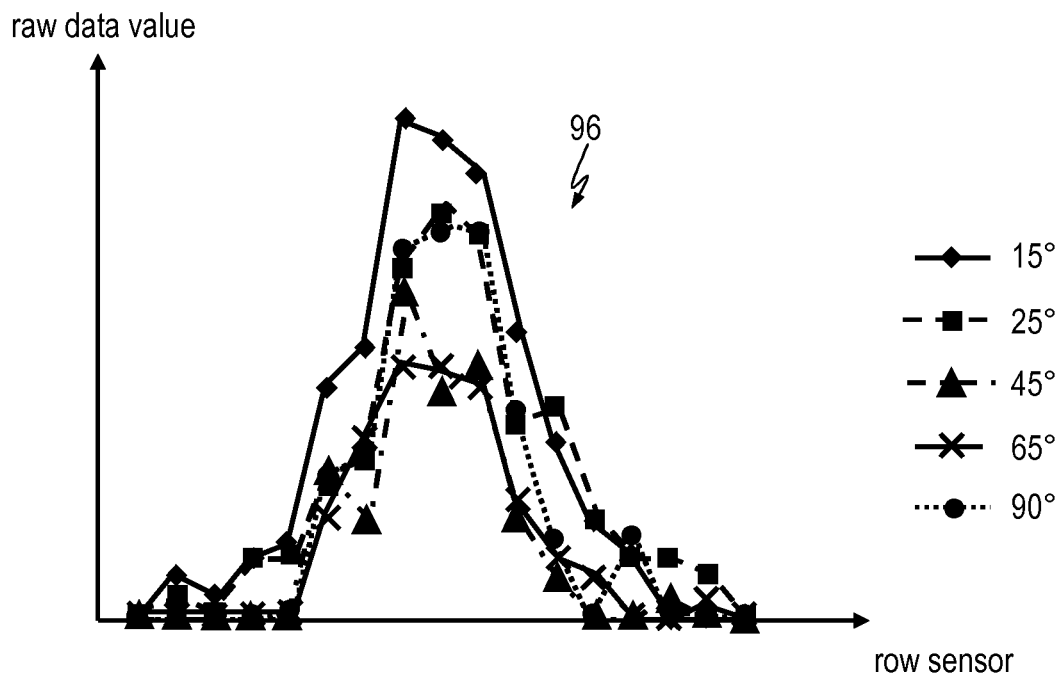
FIG. 15 and FIG. 16 show self-capacitance values obtained in a row scan and column scan for different finger angles.
Figure 16:
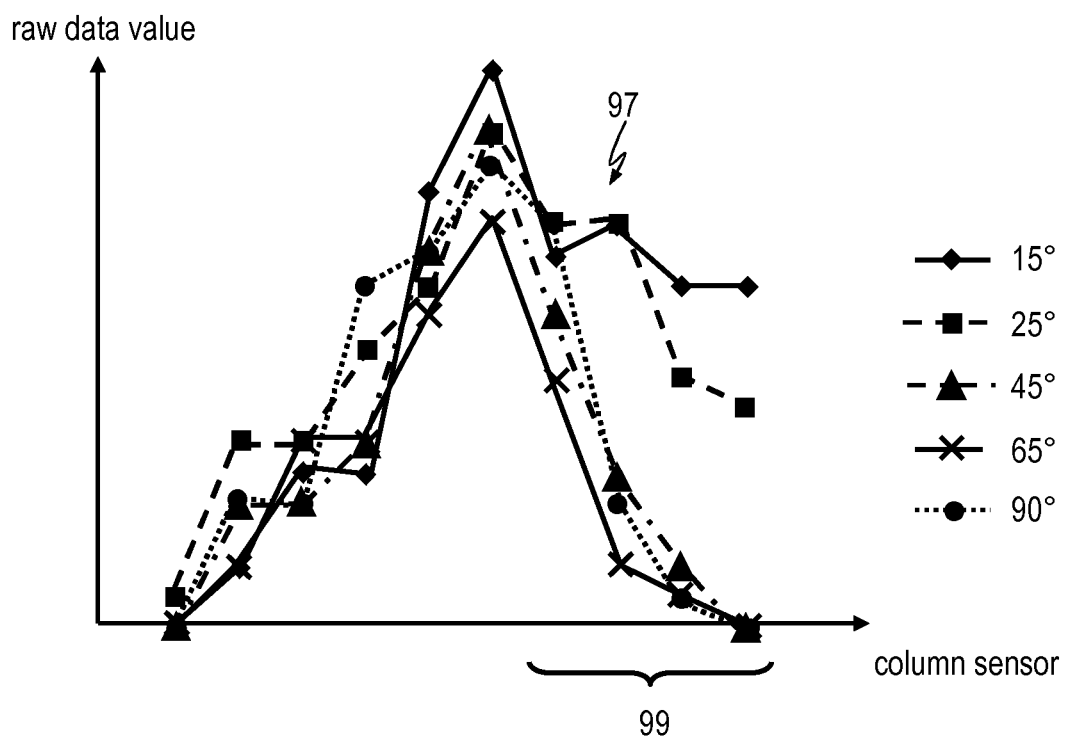

FIG. 15 and FIG. 16 illustrate data 96, 97 captured using a capacitive touch sensor array, which shows that this data allows plural finger angles to be discriminated. The data is captured using a dummy finger with a finger orientation along a central row of the display and directed at various finger angles. FIG. 15 shows the self-capacitance data 96 obtained in a row scan for various finger angles. The self capacitance has a peak at the rows where the dummy finger is located.

FIG. 16 shows the self-capacitance data 97 obtained in a column scan for various finger angles. For a finger directed towards the input surface at a smaller finger angle of 15° or 25° degrees, for example, the self-capacitance values for the columns indicated in region 99 still has fairly large values, indicating that the finger angle is small and the finger is close to the input surface even in those columns. For a finger directed towards the input surface at a finger angle of 65° or 90° degrees, the self-capacitance decreases rapidly and is small for the columns which correspond to region 99. For an intermediate finger angle of 45°, the self-capacitance decreases less rapidly in the region 99 than for the larger finger angles of 65° or 90° degrees, respectively. The capacitance data obtained in self-capacitance measurements and/or mutual capacitance allows the processing device to derive the finger angle.

Figure 17:
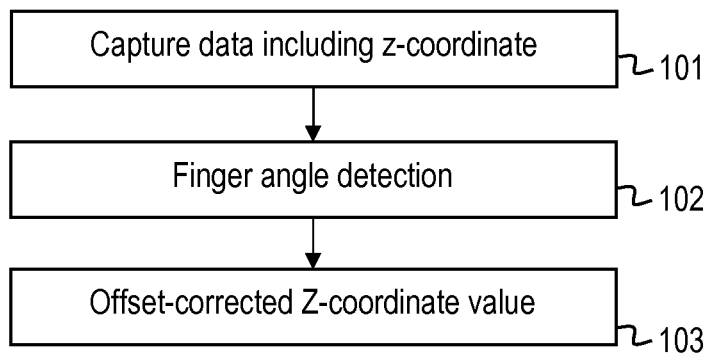
FIG. 17 is a flow chart of a method according to an embodiment.

FIG. 17 is a flow chart of a method of another embodiment. As previously indicated, a finger-angle dependent offset correction may not only be performed for the x and y coordinates of an actuation position, but may additionally or alternatively be performed also for the so-called z coordinate. Frequently, the force with which a user presses a finger or multiple fingers against the input surface is used as a z coordinate, which allows a user to activate different functions depending on how strongly he/she presses the finger(s) against the input surface.

At 101, data are captured. The data may comprise proximity data that allows the finger angle to be determined. The data comprise a z-coordinate of an actuation position. The z-coordinate may correspond to a force sensor value provided by a force sensor. The z-coordinate may quantify the force with which the finger(s) is or are pressed against the input surface.

At 102, the finger angle is determined. The finger angle may be determined using any one of the techniques described with reference to FIG. 1 to FIG. 16.

At 103, an offset-corrected z-coordinate value is determined. The processing device may determine an offset for the z-coordinate as a function of finger angle and may add the offset to the sensed z-coordinate. An application processor of the electronic device may perform an operation which depends on the offset-corrected z-coordinate value. Thereby, offset problems may be mitigated also for force sensing. As described with reference to FIG. 1 to FIG. 16, the offset may be determined by querying table(s) and/or by evaluating a function for the specific determined finger angle.

Various techniques may be used to establish an offset that is added to a sensed coordinate using the finger angle. In some implementations, look-up tables may be used. Alternatively or additionally, a mathematical function may be evaluated which depends on finger angle. Still further, interpolation techniques may be used in either case to compensate offset problems with even greater precision. The tables and/or functions which are used to determine the offset when the finger angle is known may be pre-defined data, which may be generated by sampling a large number of input operations performed by various users, for example. Alternatively or additionally, the electronic device of any embodiment may also be configured to perform a procedure in which the table(s) and/or function(s) used for offset correction may be determined for a specific user.

Figure 18:
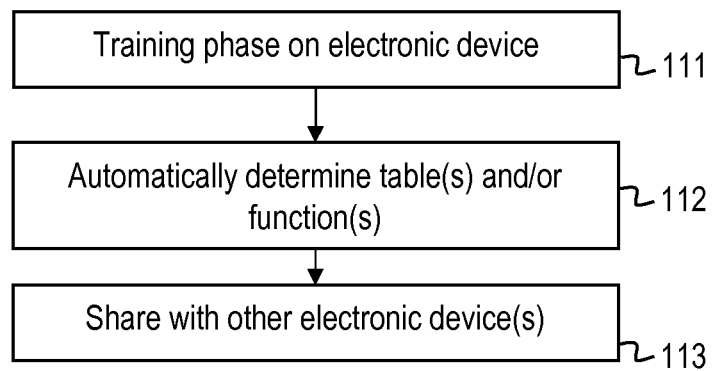
FIG. 18 is a flow chart illustrating a procedure of training an electronic device according to an embodiment.

FIG. 18 is a flow chart of such a procedure which may be performed by an electronic device of any embodiment. At 111, a training phase is executed in which the electronic device automatically determines offsets between intended and actual actuation positions. The offsets are determined for various finger angles. The electronic device may output a message or other graphical data requesting the user to press his finger against a target location. The actual actuation position and finger angle may be recorded. The offset between actual actuation position and target location may be recorded in association with the respective finger angle. To generate tables or functions that do not only depend on finger angle, but also depend on the finger which is pressed against the input surface or on the device orientation, such data may be recorded for input actions performed with various fingers and/or for different device orientations.

At 112, the offsets and associated finger angles determined at 111 are used to generate a table and/or function which may subsequently be used for determining an offset when the finger angle is known. When table(s) are used by the processing device to determine an offset for a given finger angle, the data captured at 111 may be written into the table(s). When function(s) are evaluated by the processing device to determine an offset for a given finger angle, parameters of the functions (e.g. coefficients of a polynomial) may be set so as to fit the data captured at 111. These steps may be performed automatically by a processor of the electronic device.

The table(s) and/or function(s) determined at 112 may be stored in the electronic device for subsequent use in performing offset-correction.

At 113, the table(s) and/or function(s) determined at 112 may optionally be shared with at least one further electronic device according to an embodiment. This may be beneficial in particular when one user uses different electronic devices or starts using a new electronic device after having trained another electronic device in accordance with steps 111 and 112. The table(s) and/or function(s) determined at 112 may be transferred to the other electronic device, e.g. using a near field communication technique or via a wireless communication networks.

Figure 19:
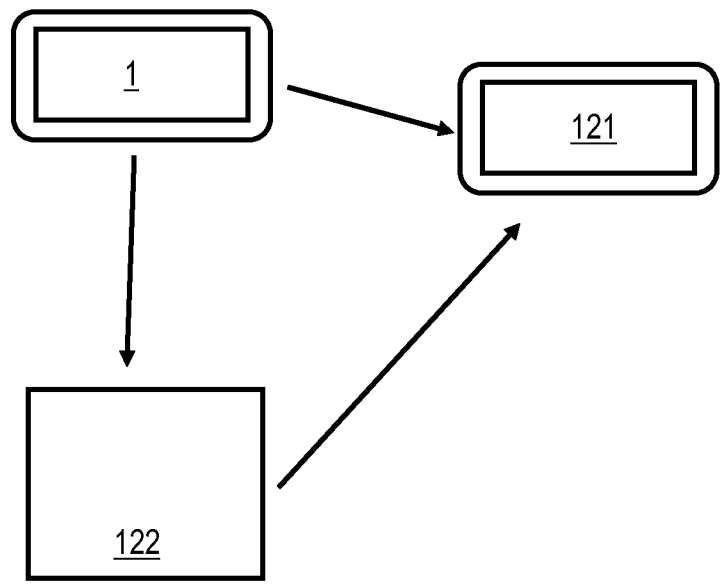
FIG. 19 illustrates a communication system comprising at least one electronic device according to an embodiment.

FIG. 19 is a block diagram representation of a communication system. The communication system has electronic devices 1, 121 which respectively are configured as electronic devices according to an embodiment. The electronic device 1 may perform the procedure explained with reference to FIG. 18 to automatically generate the data structures which are subsequently used in finger angle dependent offset correction. The electronic device 1 may transfer these data structures to the other electronic device 121. This may be done directly, e.g. using Bluetooth communication. Alternatively, the electronic device 1 may transfer the data structures which are subsequently used in offset correction to a server 122 interfaced with a mobile communication network. The other electronic device 121 may retrieve the data structures from the server 122.

The data structures which are used for offset correction, e.g. table(s) and/or functions which allow an offset to be determined as a function of finger angle, may have various formats. For illustration, offsets may be specified in units of pixels. Alternatively, offsets may be specified in terms of relative magnitudes measured with respect to dimensions of the input surface. For illustration, a table may store numerical values which quantify offsets in units of pixels or in units of a given percentile (e.g. 1%) of a display width or display height.

While handheld electronic devices and methods of processing user actuation of an input interface have been described with reference to the drawings, modifications and alterations may be implemented in further embodiments. For illustration, input interfaces configured as described herein may not only be used in handheld communication devices, but may also be used in a wide variety of other electronic devices having a proximity-sensitive touch sensor array.

The techniques described herein may be applied to mitigate offset problems in multi-touch input operations. In this case, the finger angles for multiple fingers may be determined. An offset-corrected actuation position may be determined for each one of the multiple fingers touching the input surface, which is respectively determined using the finger angle for the respective finger. The techniques described herein may not only be used to mitigate finger angle dependent offsets for touch actions, but may also be used to mitigate such offset problems for non-touch actuation of a user interface.

While certain techniques for determining the finger angle and/or for determining a magnitude of a position offset have been described, other techniques may be also be used. For illustration, the finger angle may be determined using self-capacitance measurements, mutual-capacitance measurements or a combination thereof. For further illustration, the magnitude of the offset which is added to the sensed actuation position may be determined using look-up tables, by interpolating between pre-defined finger angle values in dependence on the measured data, by evaluating a function which depends on the finger angle, or by using a combination of such techniques.

The touch sensor array of each embodiment may be used in combination with a display to thereby provide a graphical user interface. The graphical user interface may comprise a conventional display, a stereoscopic display or an autostereoscopic display, for example.

In each one of the embodiments, additional processing may be performed to compensate offset problems. For illustration, the processing device may be configured to at least partially compensate fat finger offsets, in addition to determining the offset which is caused by the different finger angles, or the "fly in" directions, of the finger.

Although the invention has been shown and described with respect to certain preferred embodiments, equivalents and modifications will occur to others skilled in the art upon reading and understanding the specification. The present invention includes all such equivalents and modifications and is limited only by the scope of the appended claims.

What is claimed is:

1. An electronic device, comprising: a proximity-sensitive touch sensor array which extends along an input surface of the electronic device; a force sensor configured to determine a force with which a finger is pressed against the input surface or multiple fingers are pressed against the input surface; and a processing device coupled to the touch sensor array, the processing device being configured to:

process the data captured by the touch sensor array to determine a finger angle at which the finger is directed towards the input surface and an actuation position on the input surface, determine a position offset for the actuation position on the input surface as a function of the finger angle, establish an offset-corrected actuation position as a function of the actuation position and the position offset, and
determine a force offset as a function of the finger angle,
derive an offset-corrected force value from an output of the force sensor and the force offset.

2. The electronic device of claim 1,
wherein the processing device is configured to determine a variation in distance of the finger from the input surface in a spatially resolved manner and to derive the finger angle from the variation in distance.

3. The electronic device of claim 1,
wherein the touch sensor array comprises a conductive pattern for capacitive touch and proximity sensing, and the processing device is configured to determine the finger angle from sensed capacitance values.

4. The electronic device of claim 3,
wherein the conductive pattern comprises a plurality of rows and a plurality of columns, and
wherein the processing device is configured to determine the finger angle based on self-capacitance measurements of the plurality of rows and self-capacitance measurements of the plurality of columns.

5. The electronic device of claim 4,
wherein the processing device is configured to determine the actuation position based on mutual capacitance measurements between rows and columns of the conductive pattern.

6. The electronic device of claim 4,
wherein the processing device is configured to derive the finger angle from a gradient of self-capacitances of rows and a gradient of self-capacitances of columns.

7. The electronic device of claim 4,
wherein the processing device is configured to carry out a row scan to perform the self-capacitance measurements for the plurality of rows and a column scan to perform the self-capacitance measurements for the plurality of columns, and to derive the finger angle from data obtained in the row scan and data obtained in the column scan.

8. The electronic device of claim 4,
wherein the processing device is a controller coupled to the conductive pattern and configured to provide the offset-corrected actuation position to an application processor of the electronic device.

9. The electronic device of claim 4,
wherein the processing device is configured to add an offset to the actuation position on the input surface or to subtract an offset from the actuation position on the input surface to establish the offset-corrected actuation position,
wherein the processing device is configured to establish a magnitude of the offset as a function of the finger angle.

10. The electronic device of claim 9,
wherein the processing device is further configured to derive a finger orientation from the data captured by the touch sensor array, the finger orientation defining a direction of a projection of the finger onto the input surface, and to establish a direction of the offset as a function of the finger orientation.

11. The electronic device of claim 4,
wherein the actuation position comprises a z-coordinate which depends on the force applied by the finger onto the input surface,
wherein the processing device is configured to establish an offset-corrected z-coordinate as a function of the z-coordinate of the actuation position and the finger angle.

12. The electronic device of claim 4, further comprising:
an application processor coupled to the processing device to receive the offset-corrected actuation position, the application processor being configured to perform an operation which is selected in dependence on the offset-corrected actuation position.

13. The electronic device of claim 4, wherein the processing device is configured
to detect a multi-touch input operation in which at least one further finger touches the input surface at at least one further actuation position,
to determine at least one further finger angle at which the at least one further finger is directed towards the input surface, and
to establish at least one further offset-corrected actuation position as a function of the at least one further actuation position and the at least one further finger angle.

14. The electronic device of claim 1,
wherein the processing device is configured to derive a direction of the force sensed by the force sensor based on the finger angle.

15. The electronic device of claim 1,
wherein the electronic device is configured to perform an operation in response to the offset-corrected force value.

16. A method of processing a user actuation of an input surface of an electronic device, the method comprising: capturing data using a proximity-sensitive touch sensor array which extends along the input surface of the electronic device;
processing the data captured by the touch sensor array to determine a finger angle at which a finger is directed towards the input surface and an actuation position on the input surface;
determining a position offset for the actuation position on the input surface as a function of the finger angle,
establishing an offset-corrected actuation position as a function of the actuation position and the position offset; and
sensing, by a force sensor, a force with which a finger is pressed against the input surface or multiple fingers are pressed against the input surface;
determining a force offset as a function of the finger angle,
deriving an offset-corrected force value from an output of the force sensor and the force offset.

* * * * *